US008422641B2

(12) United States Patent
Martin, II

(10) Patent No.: US 8,422,641 B2
(45) Date of Patent: Apr. 16, 2013

(54) DISTRIBUTED RECORD SERVER ARCHITECTURE FOR RECORDING CALL SESSIONS OVER A VOIP NETWORK

(75) Inventor: James Paul Martin, II, Vadnais Heights, MN (US)

(73) Assignee: Calabrio, Inc., Minneapolis, MN (US)

( * ) Notice: Subject to any disclaimer, the term of this patent is extended or adjusted under 35 U.S.C. 154(b) by 959 days.

(21) Appl. No.: 12/484,834

(22) Filed: Jun. 15, 2009

(65) Prior Publication Data

US 2010/0316199 A1 Dec. 16, 2010

(51) Int. Cl.
*H04M 1/64* (2006.01)
*H04L 12/66* (2006.01)
*G10L 17/00* (2006.01)

(52) U.S. Cl.
USPC ........ 379/88.08; 370/230; 370/332; 370/352; 370/356; 379/85; 379/88.25; 379/114.14; 379/189; 379/265.09; 455/424; 704/221; 704/258; 704/273

(58) Field of Classification Search .................. 370/230, 370/332, 352, 356; 379/85, 88.08, 88.25, 379/142.06, 265.09, 114.14, 189; 455/424; 704/221, 258, 273

See application file for complete search history.

(56) References Cited

U.S. PATENT DOCUMENTS

| | | | |
|---|---|---|---|
| 5,647,002 A | 7/1997 | Brunson | |
| 5,740,240 A | 4/1998 | Jolissaint | |
| 5,917,903 A | 6/1999 | Jolissaint | |
| 6,169,896 B1 * | 1/2001 | Sant et al. ..................... | 455/424 |
| 6,496,483 B1 | 12/2002 | Kung et al. | |
| 6,801,618 B2 | 10/2004 | Nygren et al. | |
| 6,925,499 B1 | 8/2005 | Chen et al. | |
| 7,035,847 B2 | 4/2006 | Brown et al. | |
| 7,054,420 B2 * | 5/2006 | Barker et al. .............. | 379/88.25 |
| 7,295,970 B1 * | 11/2007 | Gorin et al. ................... | 704/221 |
| 7,386,105 B2 * | 6/2008 | Wasserblat et al. ...... | 379/114.14 |
| 7,450,711 B2 | 11/2008 | Agapi et al. | |
| 7,499,530 B2 | 3/2009 | Carroll et al. | |
| 7,523,413 B2 | 4/2009 | Sims | |
| 7,529,357 B1 * | 5/2009 | Rae et al. ...................... | 379/189 |
| 7,584,101 B2 | 9/2009 | Mark et al. | |
| 7,584,104 B2 * | 9/2009 | Schroeter ...................... | 704/258 |
| 7,590,229 B2 * | 9/2009 | Bangor et al. ........... | 379/142.06 |
| 7,644,096 B2 * | 1/2010 | Sjolander ............... | 707/999.101 |
| 7,873,035 B2 * | 1/2011 | Kouretas et al. .............. | 370/356 |
| 7,899,167 B1 * | 3/2011 | Rae ............................... | 379/189 |
| 8,199,886 B2 * | 6/2012 | Calahan et al. ................. | 379/85 |

(Continued)

OTHER PUBLICATIONS

International Search Report and Written Opinion issued in PCT/US2011/026835, mailed May 5, 2011, 14 pages.

(Continued)

*Primary Examiner* — Gerald Gauthier
(74) *Attorney, Agent, or Firm* — Faegre Baker Daniels LLP

(57) ABSTRACT

Devices, systems, and methods for recording call sessions over a VoIP network using a distributed record server architecture are disclosed. An example recording device for recording segments of a call session includes a record server configured to receive an agent voice data stream and an external caller voice data stream from an agent telephone station, and a file repository configured to store voice data and call data associated with each recorded segment of the call session. The recording device is configured to tag recorded segments of each call session, which can be later used by a third-party application or database to check the status and/or integrity of the recorded call session.

29 Claims, 9 Drawing Sheets

U.S. PATENT DOCUMENTS

| | | | |
|---|---|---|---|
| 8,219,404 B2* | 7/2012 | Weinberg et al. | 704/273 |
| 2004/0207724 A1 | 10/2004 | Crouch et al. | |
| 2005/0233733 A1 | 10/2005 | Roundtree et al. | |
| 2005/0278655 A1 | 12/2005 | Sims | |
| 2006/0168234 A1 | 7/2006 | Safstrom et al. | |
| 2006/0198363 A1 | 9/2006 | Silverman et al. | |
| 2006/0274756 A1 | 12/2006 | Karia et al. | |
| 2007/0106934 A1 | 5/2007 | Muschett et al. | |
| 2007/0276910 A1 | 11/2007 | Deboy et al. | |
| 2007/0297578 A1 | 12/2007 | Blair et al. | |
| 2008/0034094 A1 | 2/2008 | Safstrom et al. | |
| 2008/0056241 A1* | 3/2008 | Haddad et al. | 370/352 |
| 2008/0137640 A1 | 6/2008 | Calahan et al. | |
| 2008/0137641 A1 | 6/2008 | Calahan et al. | |
| 2008/0137820 A1 | 6/2008 | Calahan et al. | |
| 2008/0219243 A1 | 9/2008 | Silverman | |
| 2008/0240404 A1 | 10/2008 | Conway et al. | |
| 2008/0240405 A1 | 10/2008 | Conway et al. | |
| 2008/0301021 A1 | 12/2008 | Sang | |
| 2009/0016522 A1 | 1/2009 | Torres et al. | |
| 2009/0034693 A1 | 2/2009 | Anderson | |
| 2009/0055548 A1 | 2/2009 | Williams et al. | |
| 2009/0074156 A1 | 3/2009 | Ku et al. | |
| 2009/0185673 A1* | 7/2009 | Erhart et al. | 379/265.09 |
| 2009/0303875 A1* | 12/2009 | Matsumura | 370/230 |
| 2009/0909875 | 12/2009 | Matsumura | |
| 2010/0226339 A1* | 9/2010 | Stephenson et al. | 370/332 |
| 2010/0316199 A1* | 12/2010 | Martin, II | |
| 2011/0216896 A1 | 9/2011 | Martin, II et al. | |
| 2011/0235520 A1 | 9/2011 | Maciej et al. | |

OTHER PUBLICATIONS

International Search Report and Written Opinion issued in PCT/US2011/026839, mailed May 5, 2011, 12 pages.

International Search Report and Written Opinion issued in PCT/US2010/034742, mailed May 13, 2010, 11 pages.

* cited by examiner

DISTRIBUTED RECORD SERVER ARCHITECTURE FOR RECORDING CALL SESSIONS OVER A VOIP NETWORK

TECHNICAL FIELD

The present invention relates generally to the field of recording voice and data communications over a network. More specifically, the present invention pertains to devices, systems, and methods for recording call sessions over a Voice over Internet Protocol (VoIP) network using a distributed record server architecture.

BACKGROUND

The recording of voice and data communications between customers and agents of a company is becoming increasingly important in certain industries, particularly where the quality of customer interactions needs to be monitored for quality assurance purposes, or where legal or security issues resulting from customer interactions need to be considered. In the financial services industry, for example, the recording of telephone calls between customers and agents is often necessary to ensure legal and regulatory compliance with securities laws and regulations, and to evaluate customer interactions for quality assurance purposes. In some cases, for example, a telephone conversation between a customer and an agent may need to be saved for later verification by a broker-dealer that the customer requested a particular trade or that the customer was properly informed of the risks associated with purchasing a particular investment. Other industries in which voice and data communications are routinely recorded include the healthcare industry, for documenting health advice or to resolve patient disputes, and in customer service centers for settling customer complaints and for training purposes.

The recording of voice communications over a Voice over Internet Protocol (VoIP) network is typically accomplished using a record server coupled to each agent's telephone, either directly via a built-in-bridge or indirectly through a router or gateway. In real-time applications, the voice communications to be recorded are often fed to the record server as a single stream of data packets using a standardized packet format such as Real-time Transport Protocol (RTP). Recording of telephone conversations can be done either automatically for each call received by the agent, or selectively upon the occurrence of a certain event or condition or by a manual request received from the agent or from another individual. In some customer service centers, for example, the recording of a telephone conversation between a customer and a customer service representative may be triggered manually by a request from the agent or automatically from a software application in response to an event such as a customer complaint. In some systems, multiple record servers may be employed in a VoIP environment to provide a level of redundancy or failover protection in the event one or more of the record servers fail, experiences an overflow error or becomes unstable, is taken off-line, or otherwise becomes incapable of recording the data stream.

The ability to recover from a failure during an in-session recording without compromising the recording or the overall efficiency of the system is often difficult in a multiple record server environment. Current recording schemes that utilize multiple record servers for recording call sessions are often inadequate in recovering from such failures, particularly where portions of each recorded call session are distributed across multiple record servers. Enterprise software applications that rely on the accurate recording of call sessions may invoke different business rules depending on whether the entire call session was recorded or whether portions of the recorded call session are missing. In some cases, it may be necessary for the enterprise software application to perform additional manipulation of recorded call sessions that may have experienced an error during the recording process. For example, if the recorded call session relates to a trade confirmation between a broker-dealer and a customer, the enterprise software application for the broker-dealer may implement a business rule that automatically deletes the recorded call session upon receiving notice that a failure in the recording may have occurred. Based on this notification, the broker-dealer application may then prompt the agent that handled the call to take further action with the customer to reconfirm the trade and/or record the trade discussion.

SUMMARY

The present invention pertains to devices, systems, and methods for recording call sessions over a Voice over Internet Protocol (VoIP) network using a distributed record server architecture. An illustrative recording device for recording segments of a call session includes a recording service configured to receive an agent voice data stream and an external caller voice data stream from an agent telephone station, and a file storage repository configured to store voice data and call data associated with each recorded segment of the call session. The recording device can be configured to tag recorded segments of the call session with a tag that indicates the status and integrity of the recorded call session. In certain embodiments, for example, the tag may comprise a parameter or field that is associated with each recorded segment. In use, the tags can be used by third-party applications (e.g., an enterprise software application) to perform additional steps related to those call sessions that may have experienced an error during the recording process.

An illustrative system for recording call sessions over a VoIP network includes at least one agent telephone station configured to record call sessions between an agent and one or more external callers on a telephone network (e.g., a PSTN), a plurality of record servers configured to record both agent voice data and external caller voice data from the agent telephone station, and a proxy server configured to selectively route the agent voice data and external caller voice data for each call session to one or more of the record servers. Each record server can include a recording service configured to tag recorded segments of a call session with an identifier such as a parameter or field indicating the recording state of the call session. In some embodiments, for example, the recording service may tag a recorded segment of a call session with a state field indicating that an upstream or downstream failure occurred during the recording, or that the recording did not complete normally. Each of the record servers can further include a file storage repository that stores voice data and call data associated with each recorded segment of the call session. In certain embodiments, one or more of the record servers can be configured to perform a segmentation synchronization routine that processes each of the tagged segments recorded across multiple record servers.

An illustrative method of recording call sessions over a VoIP network includes initiating the recording of a call session between an agent telephone station and an external caller and receiving an agent voice data stream and an external caller voice data stream from the station, prompting a plurality of recording devices to record segments of the call session, tagging each recorded segment of the call session with an identifier indicating the recording state of the call session, storing each recorded segment of the call session within a file storage repository, and gathering each of the tagged segments recorded on each of the recording devices and storing the segments as a single call session.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
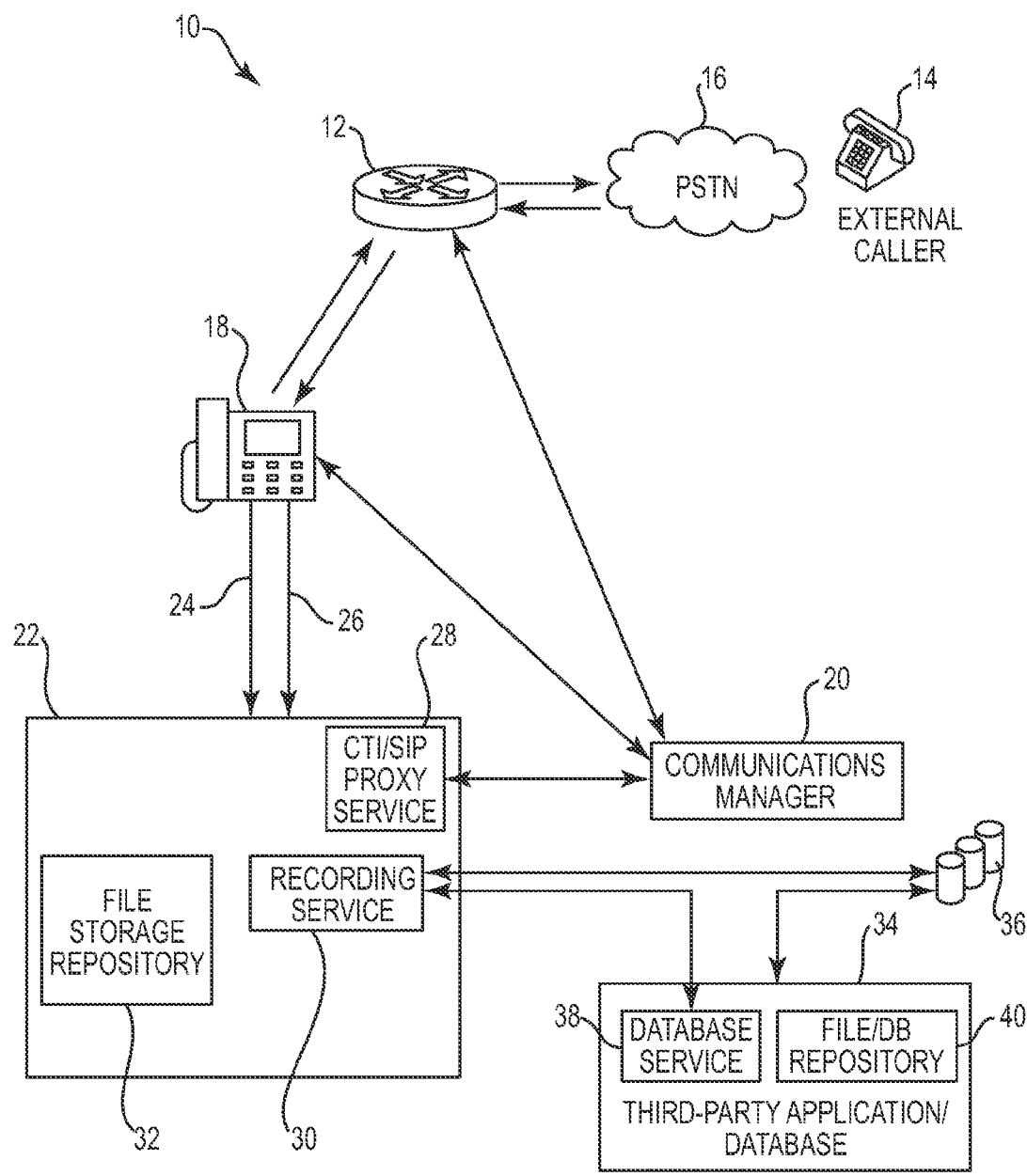
FIG. 1 is a schematic view of an illustrative system for recording call sessions over a VoIP network.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a schematic view of an illustrative system 10 for recording call sessions over a communication network. The system 10, illustratively an IP telephony system for recording telephone call sessions made over a Voice over Internet Protocol (VoIP) network, includes a router or gateway 12 that routes calls from an external caller 14 via a Public Switched Telephone Network (PSTN) 16 to an agent telephone station 18 for handling by an agent. The agent telephone station 18 may comprise, for example, a VoIP-enabled telephone and/or computer telephony interface used to communicate with the external caller 14. In a customer service center environment, for example, the agent telephone station 18 may comprise a VoIP-enabled telephone and a computer terminal that can be used to access information about the external caller's account. The VoIP telephone can be implemented as a soft phone executing on a computer, or a stand-alone VoIP telephone. The agent telephone station 18 can also include a computer terminal having various functionality, including, but not limited to, enterprise business applications, instant messaging, browsing, chat, message boards, and/or email capabilities. In some embodiments, the agent telephone station 18 may also include video conferencing equipment. The equipment associated with each agent telephone station 18 may be used to carry out communications (i.e., voice-only telephone calls or videoconferencing) with external callers 14 through the system 10. Although only a single agent telephone station 18 is shown in FIG. 1, multiple agent telephone stations 18 can be connected to any number of external callers 14 via the router or gateway 12.

A communications manager 20 is configured to send commands to the router or gateway 12 for routing external callers 14 to each agent telephone station 18. For a VoIP network operating on a PSTN network, for example, the communications manager 20 may communicate with the router or gateway 20 using a suitable protocol such as, for example, a Media Gateway Control Protocol (MGCP), which negotiates the voice data streams back and forth between the external caller 14 and the agent telephone station 18 as an end-point. In those embodiments in which audio-visual communications are to occur between the external caller 14 and agent telephone station 18, a suitable multimedia protocol such as H323 or the like may be used by the communications manager 20 to signal and control multimedia content between the external caller 14 and the agent telephone station 18.

In certain embodiments, the agent telephone station 18 may include a VoIP telephone having a built-in-bridge (BIB) feature that enables transmission of voice and/or video streams to a record server 22, allowing the agent to initiate a recording session of a call with an external caller 14 directly from the agent telephone station 18. In some embodiments, for example, an agent may initiate a call session to be recorded by selecting a button or inputting a command to the agent telephone station 18. Alternatively, or in addition, the communications manager 20 may automatically initiate the recording of a call session with an external caller 14 based on a business rule or condition from a third-party application (e.g., an enterprise software application), or from a manual request made by an agent from another agent telephone station 18.

The record server 22 communicates with the communications manager 20 and each agent telephone station 18 within the system 10, and is configured to record voice and/or data stream packets associated with both the agent voice stream 24 and the external caller voice stream 26 as separate streams during a recorded call session. The record server 22 includes a CTI/SIP proxy service 28, a recording service 30, and a file storage repository 32. The CTI/SIP proxy service 28 is an intermediate entity or interface that functions as both a server and a client for the purpose of making requests on behalf of the communications manager 20 and/or the agent telephone station 18. During recording, the CTI/SIP proxy service 28 is configured to facilitate communications between the communications manager 20 and the record server 22, including decisions on whether to feed RTP stream packets containing the agent voice stream 24 and external caller voice stream 26 to the record server 22. The CTI/SIP proxy server 28 may comprise, for example, a software application and/or hardware operable on the record server 22 that routes the RTP streams 24,26 from each agent telephone station 18 to the record server 22 and which manages Session Initiation Protocol (SIP) sessions between the record server 22 and the communications manager 20, or between the record server 22 and any third-party application(s) 34 and/or storage area networks or network-attached storage devices 36 employed by the system 10.

The file storage repository 32 includes one or more permanent or temporary storage devices for storing voice data, and in some embodiments also video or screen capture data, in the record server 22. The file storage repository 32 may include, for example, one or more magnetic or optical storage devices for storing voice data as well as other call data associated with recorded call sessions. An example of call data that can be associated with each recorded call session can include service data point (SDP) information from the agent's telephone station 18 such as caller ID, directory number (DL), device name (e.g., MAC address), line display name, near-end/far-end data, etc. Other information such as time/date stamp information and metadata can also be associated with each recorded call session.

The data stored in the file storage repository 32 may be accessible by one or more third-party applications 34 via an application programming interface (API) of the recording service 30 and a database service 38. The third-party application or database 34 may comprise, for example, an enterprise software application that can access recorded call sessions stored in the file storage repository 32 for performing various tasks. In some embodiments, the third-party application or database 34 can be configured to access the file storage repository 32 to tag recorded call sessions to implement a specific retention policy, to move recorded call sessions to an alternative storage location such as a storage area network or network-attached storage device 36, to change the file format of recorded call sessions, etc. The third-party application or database 34 can also be used to playback recorded call sessions, to perform cleanup or archival services on the recorded call sessions, to authenticate recorded call sessions (e.g., using voice recognition verification), and/or to search, export, or edit metadata or other information associated with the recorded call sessions. In some embodiments, the third-party application or database 34 may also include a file/database repository 40 for storing copies of recorded call sessions as well as any information and/or metadata associated with the call sessions.

Figure 2:
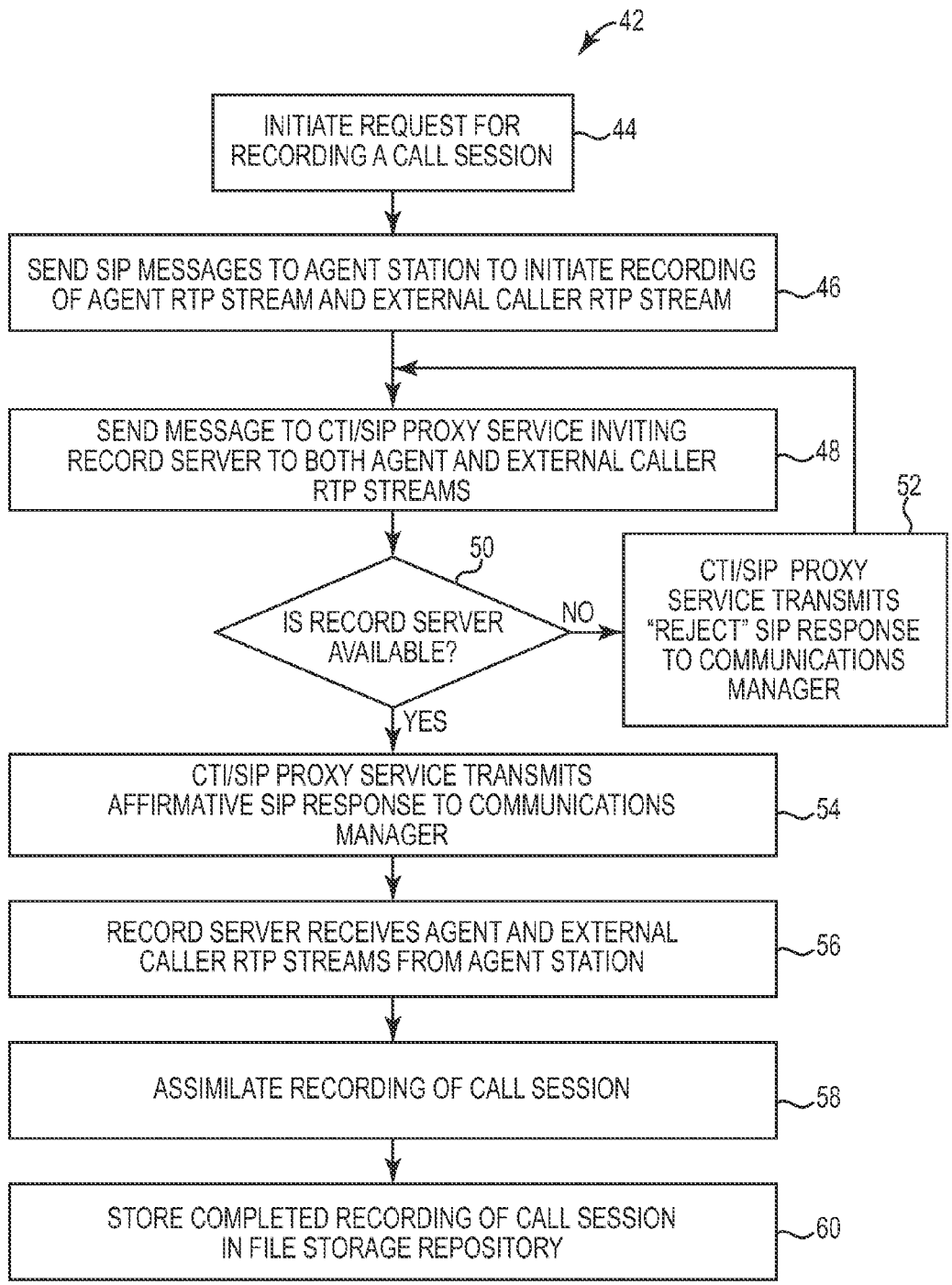
FIG. 2 is a flow diagram showing an illustrative method of recording a call session over a VoIP network using the illustrative system of FIG. 1.

FIG. 2 is a flow diagram showing an illustrative method 42 of recording a call session over a VoIP network using the illustrative system 10 of FIG. 1. The method 42 may begin generally at block 44, in which a request for recording of call session between an agent telephone station 18 and an external caller 14 is initiated. The request may be initiated by the communications manager 20, either automatically upon routing a call from an external caller 14 to the agent telephone station 18, or in response to a business rule or event programmed within the communications manager 20 or received by a third-party application or database 34. For example, the request may be initiated in response to a business rule from an enterprise software application requiring all calls to a particular agent or of a particular type be automatically recorded. The request for recording the call session may also be initiated manually by the agent tasked to handle the call session, or on an ad-hoc basis from another agent station (e.g., a supervisory agent or compliance officer) responsible for oversight of customer calls with the agent.

Upon receiving a recording request (block 44), the communications manager 20 may send two call setup messages or commands to the agent telephone station 18 via a Session Initiated Protocol (SIP) request (block 46), prompting the agent telephone station 18 to begin recording both the agent voice RTP stream 24 and the external caller 26 voice RTP stream components of the call session. To instigate the recording, the communications manager 20 may also send a message or command to the record server 22 (block 48) via the CTI/SIP proxy service 28, inviting the record server 22 to both voice RTP streams 24,26 via a SIP trunk.

The CTI/SIP proxy service 28 then determines whether the record server 22 is available to record the call session (block 50). If the record server 22 determines that it is not available to record the call session, the record server 22 may reject the invite from the communications manager 20, preventing the agent telephone station 18 from feeding the RTP streams 24,26 to that record server 22. If, for example, the record server 22 determines that it has reached a predetermined number of concurrent recording sessions, or has exceeded a certain performance threshold (e.g., CPU utilization, memory, Disk I/O, etc.), the CTI/SIP proxy service 28 may transmit a SIP message back to the communications manager 20 rejecting the invitation (block 52). As discussed further herein, the communications manager 20, or another, external CTI/SIP proxy service may then send a message to another, available record server within the system 10 to initiate recording of the call session.

If at block 50 the record server 22 is available for recording the call session, the record server 22 may accept both SIP messages with an affirmative SIP response back to the communications manager 20 (block 54). The response can include, for example, service data point (SDP) information containing the IP destination address and port associated with the record server 22. The CTI/SIP proxy service 28 then sets up the recording service 30 to receive each of the agent voice and external caller voice RTP streams 24,26 from the agent telephone station 18 (block 56). In addition to the voice data transmitted, call data information associated with the agent telephone station 18 can also be fed to the record server 22 as a part of the RTP streams 24,26. Such information can include, for example, a SIP ACK message for acknowledging receipt of the received RTP streams 24,26 and/or service data point (SDP) information from the agent telephone station 18 such as caller ID, directory number (DL), device name (e.g., MAC address), line display name, near-end/far-end data, etc. Other information and metadata can also be provided to the record server 22.

In those embodiments in which the agent telephone station 18 further includes videoconferencing or screen capturing capabilities, the SIP response from the record server 22 may also prompt the agent telephone station 18 to feed video data to the record server 22 for recordation along with the voice data. If, for example, the agent telephone station 18 is equipped for videoconferencing with the external caller 14, the record server may transmit a SIP response to the agent telephone station 18 to prompt the agent telephone station 18 to provide video data to the record server 20 along with the voice RTP stream packets 24,26.

Upon receiving the agent and external caller RTP streams 24,26, the record server 22 is then configured to assimilate the call session (block 58) from the agent telephone station 18 and store the data within the file storage repository 32. In some embodiments, additional information and/or metadata related to each of the RTP streams 24,26 may also be assimilated, which as discussed further herein, may permit a third-party application or database 34 to later extract other information from the recorded call session, including the time and date of the call, whether the call session was halted or put on hold, whether the call session was completed normally, or whether an error or failure occurred during the recording such that only a portion of the call session was recorded. Once the recording of the call session is finished, the record server 22 may then store the completed recording within the file storage repository (block 60).

Figure 3:
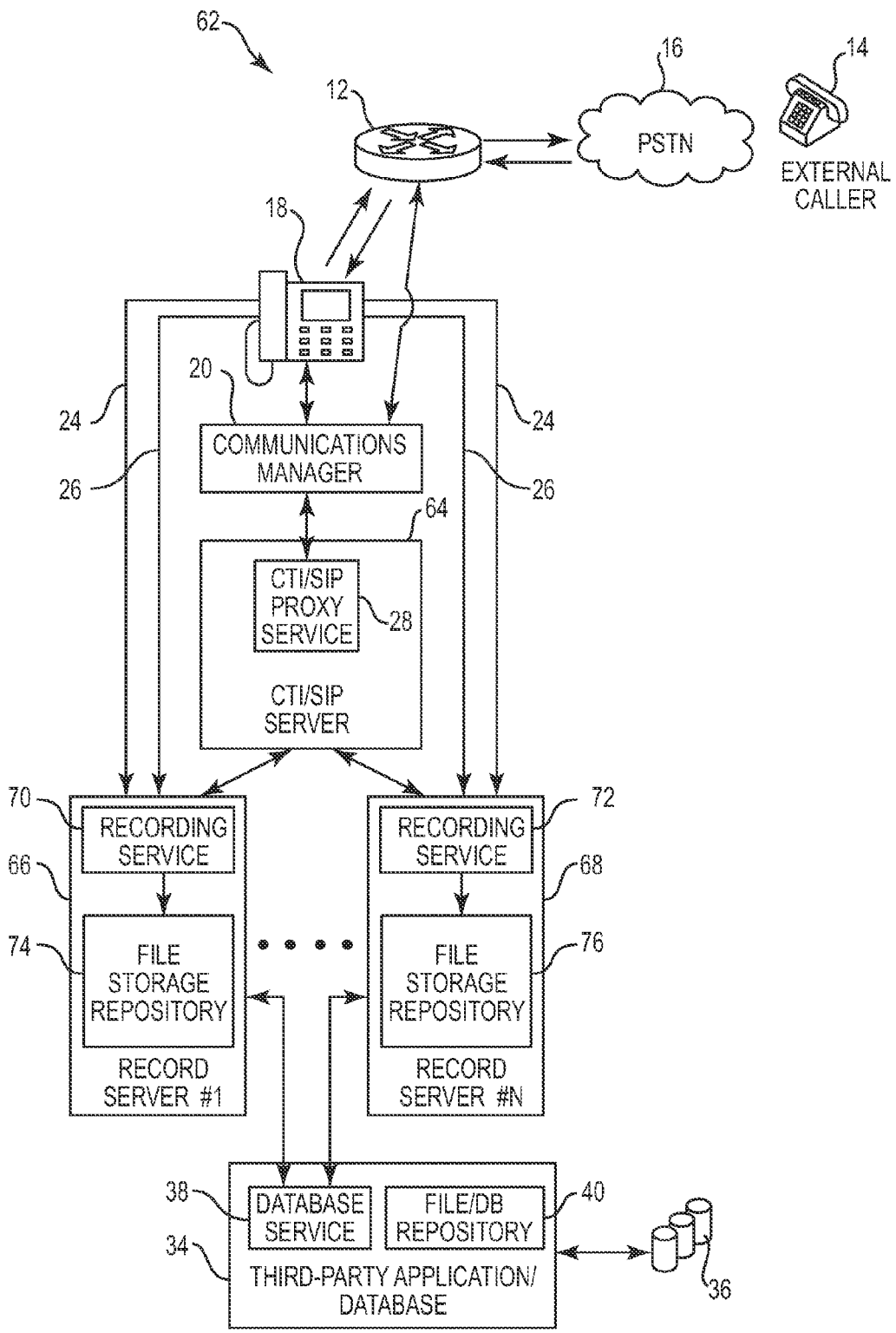
FIG. 3 is a schematic view of another illustrative system for recording call sessions over a VoIP network using multiple record servers and a single CTI/SIP server.

FIG. 3 is a schematic view of another illustrative system 62 for recording call sessions over VoIP network. In the embodiment of FIG. 3, a single CTI/SIP server 64 including a CTI/SIP proxy service 28 is configured to communicate with multiple record servers 66,68 within the system 62. In certain embodiments, the CTI/SIP server 64 and record servers 66,68 may each comprise stand-alone servers that are linked together as part of an intranet. In other embodiments, the CTI/SIP server 64 may be provided as a software application configured to operate on one of the record servers (e.g., a master record server) linked to one or more other (i.e., slave) record servers. Other configurations are also possible.

The CTI/SIP server 64 is configured to facilitate routing of RTP streams 24,26 from each agent telephone station 18 to the record servers 66,68, including managing SIP sessions between the communications manager 20 and the record servers 66,68, communications back and forth between each of the record servers 66,68, and communications between the record servers 66,68 and any third-party applications or databases 34 and/or storage area networks or network-attached storage devices 36 employed by the system 62. Each of the record servers 66,68 includes a corresponding recording service 70,72 and file storage repository 74,76, similar to the record server 22 of FIG. 1. The number of record servers 66,68 linked to the CTI/SIP server 64 may be scalable depending on various infrastructure or business requirements such as storage capacity, high availability, or performance of the system 62. Thus, although only two record servers 66,68 are shown in FIG. 3, a greater number of record servers may be connected to the CTI/SIP proxy server 64, if desired.

The CTI/SIP proxy service 28 determines which record server or servers record the agent and external caller RTP streams 24,26 received from each agent telephone station 18 during a call session. This determination may be based on a number of factors, including whether a record server is currently on-line, is functioning properly or has an invalid state, or other such failover condition. The decision to route the RTP streams 24,26 to a record server can also be based on the current load on the record servers. In some embodiments, for example, the load on the record server can be determined by comparing the current operating state (e.g., CPU utilization, file storage availability, memory availability, disk I/O) of the record server against a predetermined threshold value. If, for example, the current number of concurrent server-based recordings on a particular record server (e.g., record server 66) exceeds a particular threshold value (e.g., 600), the CTI/SIP proxy service 28 may route the recording to another record server (e.g., record server 68) that has not exceeded its maximum number of concurrent call session recordings. In certain embodiments, circular load balancing may be performed by the CTI/SIP proxy service 28 to balance the load on each of the record servers 66,68 in order to optimize resource and storage utilization globally among all record servers 66,68 within the system 62.

In some embodiments, and as discussed further herein, the CTI/SIP proxy service 28 can be configured to route the agent and external caller RTP streams 24,26 for a single call session to multiple record servers 66,68 in the event of a failover condition, or in order to load balance call sessions across the record servers 66,68. If, for example, the agent and external caller RTP streams 24,26 for a particular call session are currently being routed to a first record server (e.g., record server 66) and the call is subsequently placed on a hold for a period of time causing an interruption in the recording, the CTI/SIP proxy service 28 can be configured to reroute the RTP streams 24,26 to a second record server (e.g., record server 68) upon the continuation of the call session based on the current demand placed on each of the record servers 66,68 at the time the call session is continued. In the event of a failover condition with one of the record servers 66,68, the CTI/SIP proxy service 28 can also be configured to route the RTP streams 24,26 to another, operational record server 66,68. As a result of this load balancing and failover control scheme, the RTP streams 24,26 for each recorded call session may be distributed as partial call session segments across multiple record servers 66,68.

Figure 4:
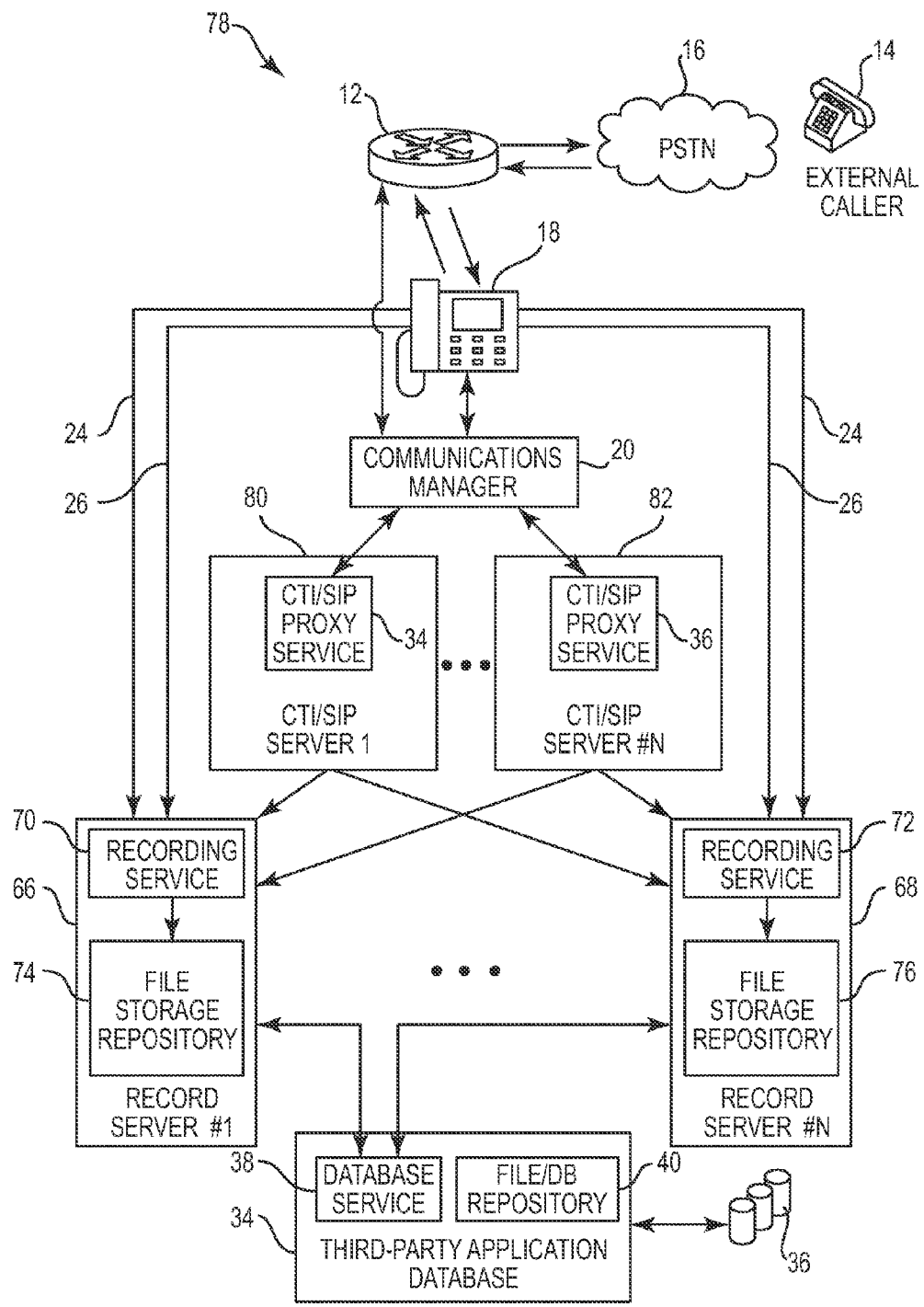
FIG. 4 is a schematic view of another illustrative system for recording call sessions over a VoIP network using multiple record servers and multiple CTI/SIP proxy servers.

In certain embodiments, the communications manager 20 can also be configured to provide load balancing and failover control over multiple CTI/SIP servers each connected to multiple record servers. In one such system 78 shown in FIG. 4, for example, the communications manager 20 may communicate with multiple CTI/SIP servers 80,82 each including an associated CTI/SIP proxy service 84,86 tasked to provide load balancing and failover control over multiple record servers 66,68 within the system 78. The communications manager 20 performs load balancing and failover control in the event one of the record servers 66,68 has reached a threshold or timeout condition, in the event all of the record servers 66,68 have reached a threshold or timeout condition, or in the event a SIP message response is not received from one or all of the CTI/SIP servers 80,82. If, for example, one of the CTI/SIP servers (e.g., server 80) tasked to route RTP streams 24,26 to the record servers 66,68 unexpectedly fails, the communications manager 20 can be configured to task another, operable CTI/SIP server (e.g., server 82) to perform such task.

The communications manager 20 may also perform load balancing and failover control based on criteria outside of the record server infrastructure. In some embodiments, for example, the communications manager 20 may perform load balancing and failover control based on a set of business rules from a third-party application or database 34 connected to the record servers 66,68.

Figure 5:
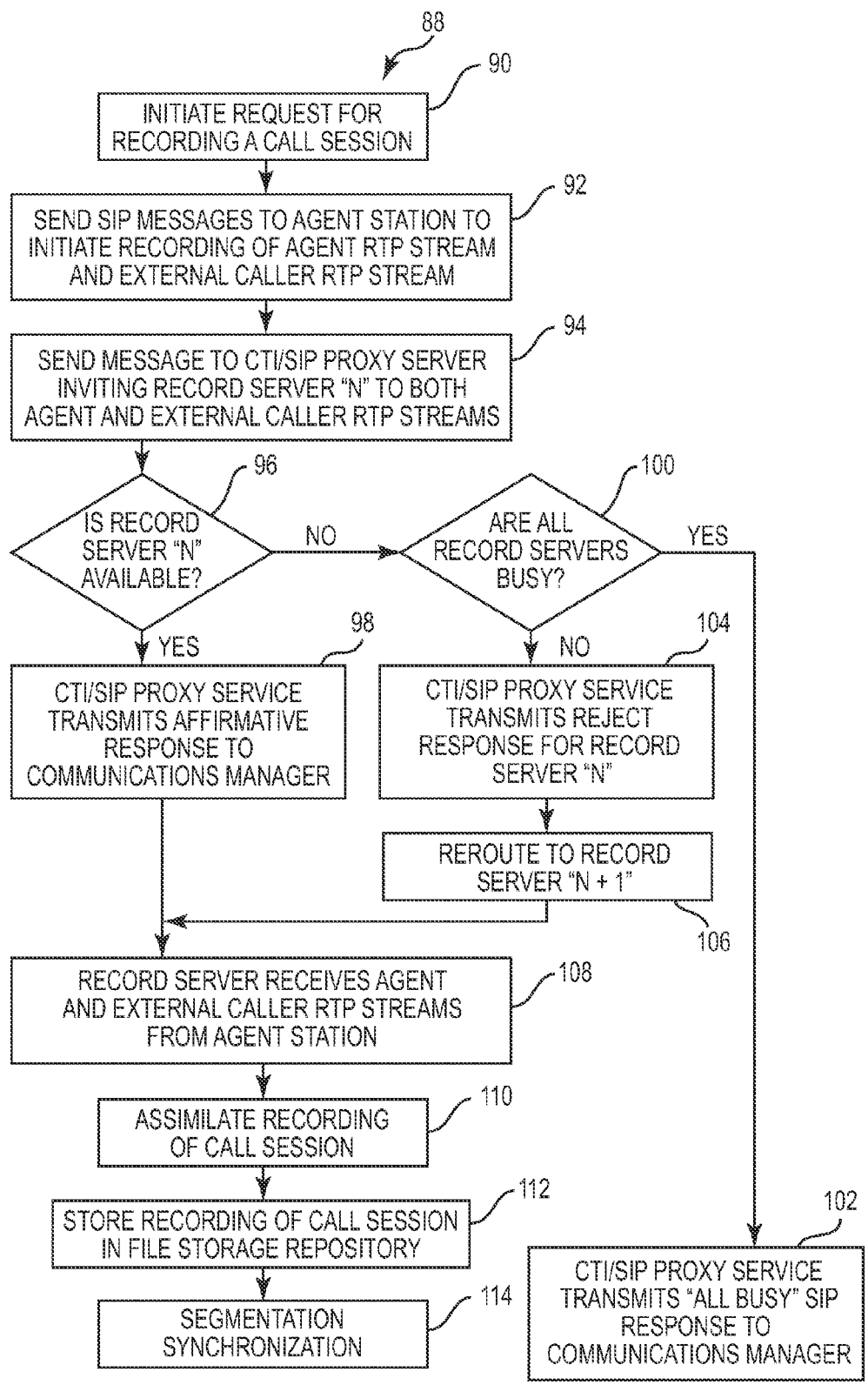
FIG. 5 is a flow diagram showing an illustrative method of recording a call session over a VoIP network using the illustrative system of FIG. 3.

FIG. 5 is a flow diagram showing an illustrative method 88 of recording a call session using the illustrative system 62 of FIG. 3. The method 88 may begin generally at block 90, in which a request for recording a call session between an agent telephone station 18 and an external caller 14 is initiated. The request may be initiated by the communications manager 20, either automatically upon routing a call from an external caller 14 to the agent telephone station 18, or in response to a business rule or event programmed within the communications manager 20 or received by a third-party application or database 34. The request for recording the call session may also be initiated manually by the agent tasked to handle the call session, or on an ad-hoc basis from another agent station (e.g., a supervisory agent or compliance officer) responsible for oversight of customer calls with the agent.

Upon receiving a recording request, the communications manager 20 may send two call setup messages or commands to the agent telephone station 18 via a SIP request (block 92), prompting the agent telephone station 18 to begin recording both the agent voice RTP stream 24 and the external caller voice RTP stream 26 components of the call session. To instigate the recording, the communications manager 20 also sends a message or command to one of the record servers 66,68 (block 94) via the CTI/SIP proxy service 28, inviting one of the record servers (e.g., record server 66) to both RTP streams 24,26 via a SIP trunk. At block 96, the CTI/SIP proxy service 28 determines whether the record server 66 is currently available to record the call session. If the record server 66 is available, the CTI/SIP proxy service 28 may respond to both messages with an affirmative SIP response back to the communications manager 20 (block 98). The affirmative SIP response can include service data point (SDP) information containing the IP destination address and port associated with that record server 66.

If at block 96 the record server 66 is not available to record the call session, the CTI/SIP proxy service 28 may then determine whether another record server (e.g., record server 68) is available (block 100). If none of the record servers 66,68 within the system 62 are available, or if an overall threshold limit associated with all of the record servers 66,68 is exceeded, the CTI/SIP proxy service 28 may reject the invite from the communications manager 20 via a SIP global response indicating that all record servers 66,68 are busy (block 102). In some embodiments, the communications manager 20 may notify the agent and, in some cases, also prompt the agent to take further action with the caller. For example, if all record servers 66,68 are unavailable, the communications manager 20 may notify the agent that the call session is not being recorded, or may further connect the call session to another agent station (e.g., a supervisor or compliance manager) that can monitor the call. In some circumstances, the unavailability of all record servers 66,68 in the system 62 may prompt the communications manager 20 to disconnect the call or perform some other action. The particular action taken by the communications manager 20 in response to the unavailability of all record servers 66,68 will vary depending on the particular business rules programmed within the communications manager 20 or provided to the communications manager 20 from another application.

If at block 100, the CTI/SIP proxy service 28 determines that another record server is available to record the call session, the proxy service 28 may transmit a SIP message back to the communications manager 20 redirecting the invitation (block 104). The CTI/SIP proxy service 28 may then reroute the call session to another record server (e.g., record server 68) for recording the call session (block 106).

Once a record server 66,68 is selected, the CTI/SIP proxy service 28 then sets up the recording service 70,72 to receive each of the agent voice and external caller voice RTP streams 24,26 from the agent telephone station 18 (block 108). In addition to the voice data transmitted, call data information associated with the agent telephone station 18 can also be provided to the record server 66,68 as part of the RTP streams 24,26. Such information can include, for example, a SIP ACK message for acknowledging receipt of the received RTP streams 24,26 and/or service data point (SDP) information from the agent telephone station 18 such as caller ID, directory number (DL), device name (e.g., MAC address), line display name, near-end/far-end, etc. Other information and metadata can also be provided to the record server 66,68. In those embodiments in which the agent telephone station 18 further includes videoconferencing or screen capturing capabilities, the SIP response from the record server 66,68 may also prompt the agent telephone station 18 to feed video or screen data to the record server 66,68 for recording along with the voice data.

The CTI/SIP proxy service 28 is configured to load balance the recording of call sessions in a circular manner that distributes the recording load proportionately between all of the record servers 66,68 within the system 62. The CTI/SIP proxy service 28 is also configured to weigh additional considerations related to the state or condition of each record server 66,68 in load balancing call sessions recorded by the record servers 66,68. In certain embodiments, for example, the CTI/SIP proxy service 28 may determine the load on each of the record servers 66,68, and then route the RTP streams 24,26 to those record servers 66,68 that are underutilized. In some embodiments, for example, the CTI/SIP proxy service 28 may reroute a call session to another record server based on the current operating state (e.g., CPU utilization, file storage availability, memory availability, disk I/O) of the record server.

Upon receiving the agent and external caller RTP streams 24,26, each of the record servers 66,68 tasked to record the call session can be configured to assimilate the call session (block 110) from the agent telephone station 18 and store the data within the file storage repositories 74,76. In some embodiments, additional information and/or metadata related to each of the RTP streams 24,26 may also be assimilated to permit any third-party applications or databases 34 to later extract other information from the recorded call session. The call session or portions of the call session recorded by each of the record servers 66,68 may then be stored within the respective file storage repositories 74,76 (block 112).

In some embodiments, one or more of the record servers 66,68 can be configured to perform a segmentation synchronization routine (block 114) if, during the assimilation of the RTP streams 24,26 from the agent telephone station 18, an event occurs that interrupts the recording of the call session. An example of an event that may invoke the segmentation synchronization routine is a hold event during a call session, in which an agent temporarily suspends the call session by placing the external caller 14 on hold, or a transfer event where the external caller 14 is transferred to another agent telephone station 18 for the remainder of the call session. This may result in the CTI/SIP proxy service 28 transmitting a SIP message to halt the record server currently recording the call session. Once the call session is resumed, the CTI/SIP proxy server 28 may then reroute the RTP streams 24,26 to another available record server to balance the load globally across all record servers. This may result in the RTP streams 24,26 for each recorded call session being distributed across multiple record servers such that each record server tasked to record the call session contains only a portion or segment of the session.

A method of tagging or scoring each recorded segment to identify the state or integrity of a recorded call session can be employed to preserve the continuity of recorded call sessions as the RTP streams 24,26 are fed to multiple record servers 66,68. In certain embodiments, for example, each of the recorded segments can be associated with a number of different state fields used by the recording services 70,72 for tagging each of the recorded call segments and for evaluating the state or integrity of a recorded call session.

Figure 6:
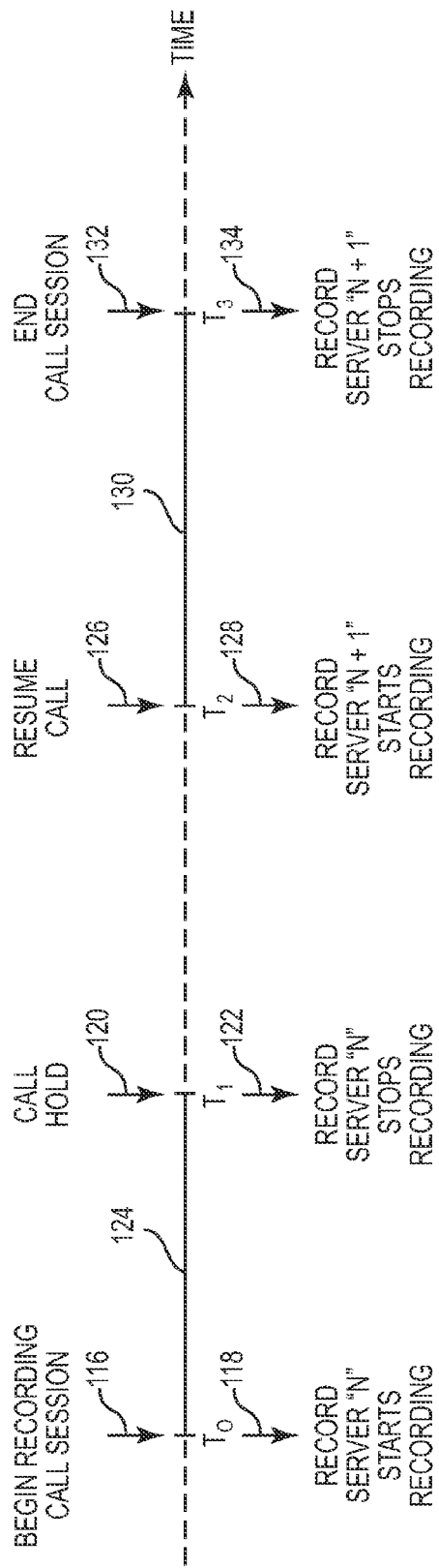
FIG. 6 is a diagram showing the recording of an illustrative call session.

An illustrative method of tagging or scoring recorded segments of a call session can be further understood with respect to an illustrative call session depicted in FIG. 6. FIG. 6 may represent, for example, the recording of a call session between an agent telephone station 18 and an external caller 14 using the system 62 of FIG. 3. In the financial services context, for example, the call session being recorded may represent a phone conversation to be recorded between a broker-dealer agent and a customer in which the customer places a trade with the agent, and in which the agent places the caller on hold for a period of time during the course of the call session in order to review the caller's account information.

At time $T_0$, a request (indicated generally by arrow 116) for recording a call session is instigated, prompting an available record server "N" (e.g., record server 66 of FIG. 3) to begin recording the call session, as indicated generally at 118. At the start of the recording, the record server (N) may initially tag the recording session as being "incomplete," indicating that the recording is ongoing and has not completed. In certain embodiments, for example, the "incomplete" state of the recording may be denoted by a state field of "0" set within the recording service for the record server (N). During recording, other information associated with the call session can also be obtained by the record server (N), including any call data information, encryption information, etc. The agent and external caller RTP stream packets are then recorded from time $T_0$ to time $T_1$ until, at such point, a call hold is requested at time $T_1$ to place the call on hold, as indicated generally at 120. The call hold request may be initiated, for example, by the agent in order to obtain more information about the external caller's account, or in order to transfer the call to another individual for servicing the call.

When a call hold request is received, the recording service is prompted to suspend recording of the call session, as indicated generally at 122. In some embodiments, the recording service is made aware of the call hold request via a CTI (e.g., JTAPI) event communicated from the communications manager 20 to the CTI/SIP proxy server 64. In response to the call hold request 120, the recording service may tag the recorded call session segment 124 as "partial," indicating that the recorded call session includes multiple segments. The "partial" state of the recorded call session can be designated, for example, by a state field of "1" set within the recording service for the record server (N).

The recording service may also designate the segment 124 of the recorded call session between time $T_0$ and $T_1$ as the first recorded segment of the call session. In certain embodiments, a segment number field of "1" is set within the recording service, indicating that the segment 124 between time $T_0$ and $T_1$ is a first segment of the recorded call session. The recording service may also set a total number of segments field to "2," indicating that the recorded call session should include at least two segments in which the second segment has not occurred at this point in time.

At time $T_2$, the agent requests that the call be resumed, as indicated generally at 126. When a call resume request is received, the communications manager 20 notifies the CTI/SIP proxy service 28 to continue recording the call session. The CTI/SIP proxy service 28 then prompts an available record server within the network to continue recording a second segment 130 of the call session beginning at time $T_2$, as indicated generally at 128. In certain embodiments, and as discussed, for example, with respect to the method 88 of FIG. 5, the CTI/SIP proxy service 28 can be configured to route the recording of the second segment 130 of the call session to a different record server (i.e., record server "N+1") in order to balance the recording load of all call sessions across each of the record servers. If, for example, the record server (N) tasked to record the first segment 124 of the call session is currently experiencing a high demand, is off-line, or is otherwise unavailable, the CTI/SIP proxy service 28 may route the recording of the second segment 130 to a different record server (N+1).

The CTI/SIP proxy service 28 is then notified by the previous record server (N) or the communications manager 20 that the second segment 130 is not a new call session, but is instead a continuation of the call session. The communications manager 20 may accomplish this, for example, using the (Directory Number (DN) and line number information associated with the agent telephone station 18 and/or the ending state of the last segment (e.g., that a hold and not a hang-up occurred). This interaction between the record servers and the CTI/SIP proxy service helps to overcome those situations where agents share multiple lines and where one agent's session is resumed by another agent after a call is placed on hold.

The new record server (N+1) may then tag the call session as again being "incomplete" (e.g., by setting a state field within the recording service to "0"). During recording, other information associated with the second segment 130 of the call session can also be obtained by the record server (N+1), including any call data information, encryption information, etc. The agent and external caller RTP stream packets 24,26 are then recorded from time $T_2$ to time $T_3$ until, at such point, a call disconnect request is received, as indicated generally at 132. The record server is then notified via a SIP disconnect message from the communications manager 20 to stop recording the call session, as indicated generally at 134.

Once a SIP disconnect message is received, the record server (N+1) changes the state of the call session from "incomplete" to "partial," (e.g., by setting a state field within the record server to "1"). The recording service may set a segment number field of "2" indicating that the session 130 between time $T_2$ and $T_3$ is a second segment of the recorded call session. The recording service may also update the total number of call segments to "2," thus identifying the second segment 130 as the final segment of the call session. At this point, the recorded call session comprises two segments 124, 130 recorded across multiple record servers (N,N+1).

Each of the record servers (N,N+1) can be configured to automatically run a segmentation synchronization routine for tagging and gathering each of the recorded call session segments 124,130 distributed across each of the record servers tasked to record the call session. The segmentation synchronization routine can be run, for example, at particular time period(s) during the day, or in response to a request from the communications manager 20 and/or a third-party application or database 34. In some embodiments, the segmentation synchronization routine is a service integrated with the record server. In one such embodiment, for example, the segmentation synchronization routine may be a part of the recording service for one or more of the record servers. In other embodiments, the segmentation synchronization routine is a stand-alone server and/or service that communicates with all of the record servers.

Figure 7:
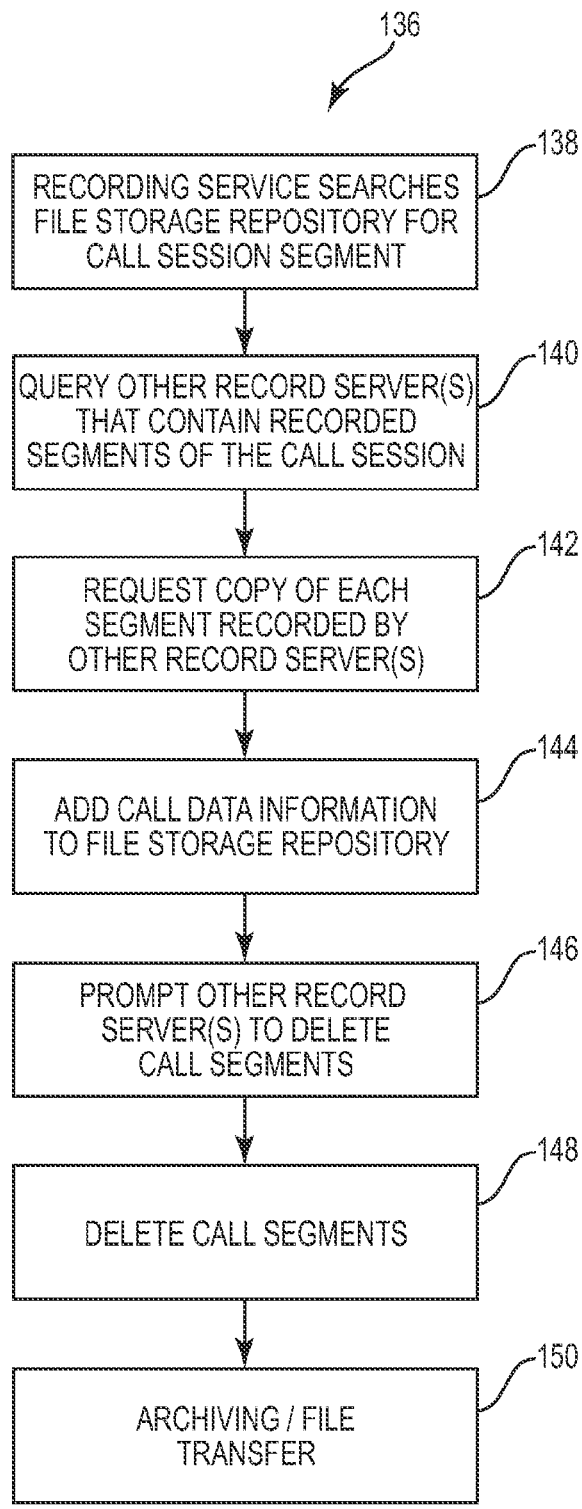
FIG. 7 is a flow diagram showing an illustrative segmentation synchronization routine for tagging and gathering call session segments recorded on multiple record servers.

FIG. 7 is a flow diagram showing an illustrative segmentation synchronization routine 136 for tagging and gathering call session segments recorded on multiple record servers. The segmentation synchronization routine 136 may comprise, for example, an algorithm that is run by the recording service of a record server tasked to record a particular segment of a call session, and may comprise several steps performed as part of the segmentation synchronization step indicated generally at block 114 in FIG. 5.

The segmentation synchronization routine 136 may begin at block 138, in which the recording service searches its own file storage repository for a call session segment corresponding to a recorded call session. The recording service may also query other record servers that may have recorded segments of the call session (block 140). In the example call session recording of FIG. 6, for example, record server "N" may search its file storage repository for any recorded call session segments (e.g., the first segment 124) as well as query the second record server "N+1" for any call session segments recorded on that server (e.g., the second segment 130).

The recording service may then request a copy of each call session segment recorded on any other record server(s) tasked to record the call session (block 142). With respect to the example call session of FIG. 6, for example, record server N may request a copy of the second recorded segment 130 as well as any call data information associated with that segment 130. The record server may then add this information to its file storage repository (block 144). The record server (N) may then repeat the process for each additional call session segment until all segments are copied to the file storage repository for the record server (N). The record server (N) may then change the status of the recording session to "complete," indicating that all call session segments have been copied.

In certain embodiments, the record servers are configured to maintain each of the recorded segments in their original storage location such that the recorded call session comprises a number of segmented call sessions spread across multiple record servers. The segmented recordings can then be later played back via a third-party application or database as separate segments or as a complete, continuous stream.

Once each of the recorded call session segments have been identified by the record server and copied, the record server may prompt the other record servers containing recorded call session segments to delete those segments (block 146). With respect to the example of FIG. 6, for example, the first record server (N) tasked to record the first segment 124 of the call session may notify the second record server (N+1) tasked to record the second segment 130 to delete the second segment 130. Each notified record server may then change the status of each segment to "delete," thus tagging those segments for later deletion.

Each of the record servers can be configured to search for any call segments within its file storage repository tagged in a "delete" state, and then automatically delete the tagged segments as well as any information associated with those segments (block 148). The deletion of tagged call segments can be performed, for example, at particular time period(s) during the day, or in response to a request from the communications manager 20 and/or a third-party application or database 34. If, for example, a segment is tagged for deletion, the record server can be configured to automatically delete the segment in response to a business rule from an enterprise software application that communicates with the record server.

In some embodiments, each record server, or alternatively another server or application linked to each record server, can be configured to perform an archiving or file transfer step (block 150) that can be used to automatically copy or move any recorded call sessions tagged as "complete" to an alternative file storage location. In certain embodiments, for example, one of the record servers can be configured to automatically move any recorded call sessions tagged as "complete" to another file storage location (e.g., an external storage area network or network-attached storage device), and then permanently delete the recording at the original file storage location. In other embodiments, the step (block 150) can include making an archival copy of any call sessions tagged as "complete" to provide a backup of the recording at an alternative file storage location. In still other embodiments, particular business rules can be invoked to determine whether a recorded call session is either permanently moved to another file storage location, or whether a backup copy is made at another file storage location.

At block 150, the recording state associated with the recorded call session may be changed depending on whether the recorded call session is being permanently moved or copied. If, for example, the recorded call session is to be copied, the recording state may be changed from a "complete" state to a "complete-copy-pending" state, indicating that the call session recording is complete and is in the process of being copied to another file storage location. The "complete-copy-pending" state of the recorded call session may be useful in the event an infrastructure failure occurs as the call session is being copied. If the call session is complete and a copy exists at another storage location, the recording state associated with the recorded call session may be changed from a "complete-copy-pending" state to "complete-copy" state, thus indicating that a copy of the recorded call session exists at another file storage location.

In similar fashion, if the recorded call session is to be permanently moved to another file storage location, the recording state may be changed from "complete" to "complete-move-pending," indicating that the call session is complete and is in the process of being moved to another file storage location. Once moved, the recording state associated with the recorded call session may be changed from "complete-move-pending" to "complete-move," indicating that the recorded call session has been successfully moved to another file storage location. The recorded call session remaining at the original file storage location may then be tagged "complete-delete," indicating that the recorded call session is complete and can be deleted.

In the event of a failure during a recording session, the record server can be configured to preserve the status of the call session and any associated call information. Such failures can include failures upstream of the record server, including a failure in the voice router or gateway, SIP trunk, agent telephone station, or communications manager. An upstream failure may comprise, for example, those failures that occur outside of the scope of the record server infrastructure. An upstream failure may result in a call session recording prematurely terminating, or in a timeout condition occurring after a period of time in which the record server does not receive the agent and external caller RTP stream packets, as expected.

In some circumstances, a downstream failure may also occur with the record server infrastructure itself. A downstream failure may comprise, for example, a failure in the file system or with the storage device used to store recorded call sessions. Such an error may occur, for example, from the failure of a storage drive within the file storage repository.

Figure 8:
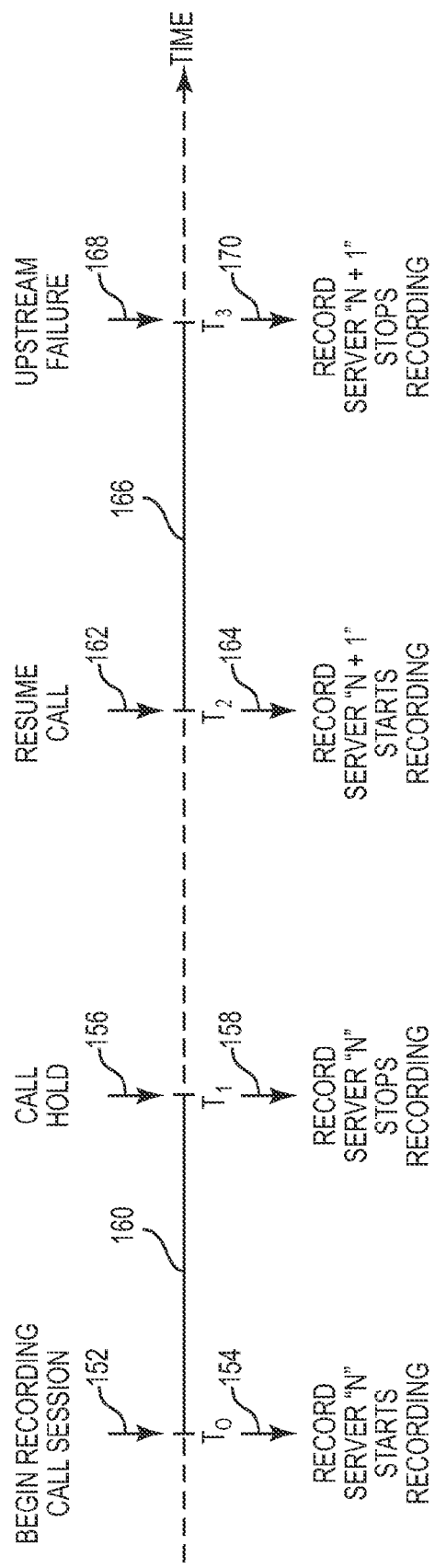
FIG. 8 is a diagram showing the recording of an illustrative call session in the event of an upstream failure.

FIG. 8 is a diagram illustrating another exemplary method of tagging or scoring recorded segments of a call session in the event of an upstream failure using the illustrative system 62 of FIG. 3. As shown in FIG. 8, at time $T_0$, a request (indicated generally by arrow 152) for recording a call session is instigated, prompting an available record server "N" of the system 62 to begin recording the call session, as indicated generally at 154. At the start of the recording, the record server (N) may initially tag the recording session as being "incomplete," indicating that the recording is ongoing and has not yet completed. In certain embodiments, for example, the "incomplete" state of the recording may be denoted by a state field of "0" set within the recording service for the record server (N). During recording, other information associated with the call session may also be obtained by the record server (N), including any call data information, encryption information, etc. The agent and external caller RTP stream packets are then recorded from time $T_0$ to time $T_1$, until, at such point, a call hold is requested at time $T_1$ to place the call on hold, as indicated generally at 156.

When a call hold request is received, the recording service is prompted to suspend recording of the call session, as indicated generally at 158. In some embodiments, the recording service is made aware of the call hold request via a CTI (e.g., JTAPI) event communicated from the communications manager 20 to the CTI/SIP proxy server 28. In response to the call hold request, the recording service may tag the recorded call session segment 160 as "partial," indicating that the recorded call session includes multiple segments. The "partial" state of the recorded call session can be designated, for example, by a state field of "1" set within the recording service for the record server (N).

The recording service may also designate the segment 160 of the recorded call session between time $T_0$ and $T_1$ as the first recorded segment of the call session. In certain embodiments, a segment number field of "1" is set within the recording service, indicating that the segment 160 between time $T_0$ and $T_1$ is a first segment of the recorded call session. The recording service may also set a total number of segments field to "2," indicating that the recorded call session currently includes two total segments.

At time $T_2$, the agent requests that the call be resumed, as indicated generally at 162. When a call resume request is received, the communications manager 20 notifies the CTI/SIP proxy service 28 to continue recording the call session. The CTI/SIP proxy service then prompts an available record server within the network to continue recording a second segment 166 of the call session beginning at time $T_2$, as indicated generally at 162. In certain embodiments, and as discussed, for example, with respect to the method 88 of FIG. 5, the CTI/SIP proxy service 28 can be configured to route the recording of the second segment 166 of the call session to a different record server (i.e., record server "N+1") in order to balance the recording load of all call sessions across each of the record servers. The CTI/SIP proxy service 28 is then notified by the previous record server (N) or the communications manager 20 that the second segment 166 is not a new call session, but is instead a continuation of the call session.

The new record server (N+1) may then tag the call session as again being "incomplete" (e.g., by setting a state field within the recoding service to "0"). During recording, other information associated with the second segment 166 of the call session can also be obtained by the record server (N+1), including any call data information, encryption information, etc. The agent and external caller RTP stream packets are then recorded beginning at time $T_2$, as indicated generally at 164.

At time $T_3$, and as indicated generally by arrow 168, an upstream failure occurs during the recording of the call session, causing the recording to prematurely terminate. An example of an upstream failure may comprise, for example, a failure in the router or gateway 12 used to route the caller to the agent's telephone station 18 during the course of the call. When an upstream failure occurs, the record server (N+1) can be prompted to discontinue recording the call session, as indicated generally at 170. In response to the failure, the record server (N+1) may then change the state of the recording from "incomplete" to "partial-external-error," indicating that an upstream failure outside of the control of the record server infrastructure has occurred. The "partial-external-error" state may be represented within the recording service, for example by a state field set to "3." The recording service may also set a segment number field to "2," indicating that the session 166 between time $T_2$ and $T_3$ is a second segment of the call session. Other relevant information related to the call session segment (e.g., time/date, length of segment, encryption information, etc.) may also be gathered by the recording service and stored in the file storage repository along with the segment 166. Additional error handling steps may be taken with respect to the recorded call segment. In some embodiments, for example, a business rule from a third-party application or database 34 may be implemented to provide monitoring and notification alerts to the agent telephone station 18 informing the agent that a failure in the call session recording has occurred, and in some cases, prompting further action by the agent.

A segmentation synchronization routine such as that discussed, for example, with respect to FIG. 7 may then be run to tag and gather call session segments recorded on each record server tasked to record the call session. If, as shown in FIG. 8, the failure occurs in recording a segment that is not the first segment 160 of the call session, the second segment 166 can be left in the "partial-external-error" recording state, and the record server (N) containing the first segment 160 can be tasked to perform the segmentation synchronization process. The recording service may then query other record servers (i.e., record server "N+1") that may have recorded segments of the call session. The recording service may then request a copy of each call session segment recorded on any other record server(s) tasked to record the call session. The record server (N) may then add this information to its file storage repository. The record server (N) may then repeat the process for each additional call session segment until all segments are copied to the file storage repository for the record server. The record server (N) may then change the state of the recording session to "complete-external-error," indicating that all call session segments have been copied, but that an error in the recording occurred.

In certain embodiments, the recording infrastructure is configured to maintain each of the recorded call session segments in their original storage location such that the recorded call session comprises a number of segmented call sessions spread across multiple record servers. The segmented recordings can be later played back via a third-party application as separate segments, or as a complete stream.

Once each of the recorded call session segments have been identified, copied, or moved by the segmentation synchronization routine, the record server may then prompt the other record servers containing recorded call session segments to delete those segments.

Figure 9:
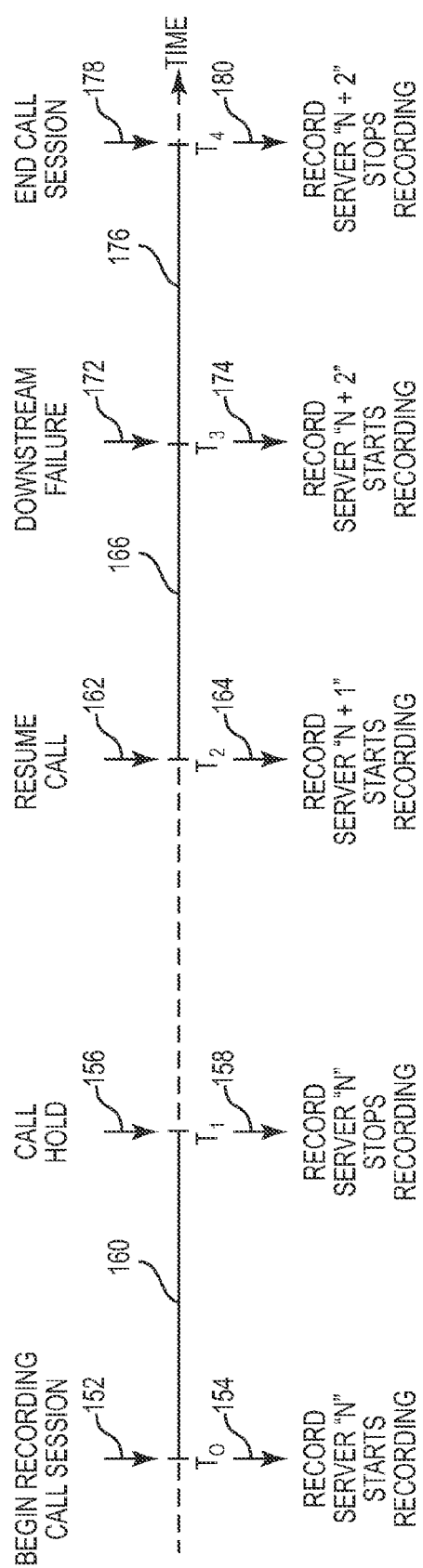
FIG. 9 is a diagram showing the recording of an illustrative call session in the event of a downstream failure.

FIG. 9 is a diagram representing another exemplary method of tagging or scoring recorded segments of a call session in the event of a downstream failure using the illustrative system 62 of FIG. 3. As shown in FIG. 9, if at time $T_3$ a downstream failure (indicated generally by arrow 172) occurs during the recording of the call session instead of an upstream failure, the record server (N+1) can be configured to immediately reroute the recording of the call session to another record server (i.e., record server "N+2") available to record the call session, as indicated generally at 174. This can be accomplished, for example, by an interface/exchange established between each of the record servers within the network.

Once the secondary record server (N+2) continues recording the call session, the record server (N+2) tags the segment 176 beginning at time $T_3$ as a third segment, and updates the recording state of that segment 176 with an initial state of "partial-internal-error-respondent," indicating that the recorded call session includes multiple segments and that an error occurred in the record server infrastructure. The "partial-internal-error-respondent" state of the recorded call session can be designated, for example, by a state field of "4" set within the recording service for the record server (N+2). The secondary record server (N+2) may also increment the total number of call segments to "3."

If at time $T_4$ a call disconnect request is received (indicated generally by arrow 178) to end the call session normally (e.g., based on a hang up or an application request from a third-party application to stop the recording), the record server (N+2) then stops the recording (as indicated generally by arrow 180), and the total number of segments field is updated accordingly. In the event the current segment 176 ends as a result of a hold or transfer request, thus resulting in further segmentation of the recorded call session, then the total number of segments fields would be incremented to the current segment number plus one. If the current call session ends as a result of an upstream failure condition, then the total number of segments field would not be updated, and the recording status of the call session would be changed to "partial-external-error-respondent," indicating that the call session includes multiple segments and that an upstream failure occurred that is outside of the control of the record server infrastructure.

A segmentation synchronization process such as that discussed, for example, with respect to FIG. 7 may then be run by the secondary record server (i.e., record server "N+2") to tag and gather call session segments recorded on each record server (N,N+1,N+2) tasked to record the call session. The secondary record server (N+2) may attempt to copy each of the recorded segments and associated call information to its file storage repository, or alternatively, leave the recording as is in a "partial-internal-error-respondent" state or a "partial-external-error-respondent" state with no attempt made to copy each of the recorded segments. If the secondary record server (N+2) is configured to copy each of the recorded segments, the secondary record server (N+2) may then request a copy of each call session segment and associated call information recorded on any other record server(s) tasked to record the call session.

Once copying of the call session segments to the secondary record server (N+2) is complete, the secondary record server (N+2) may then change the state of the recorded call session to a "complete-internal-error-respondent" state, indicating that all call session segments have been copied but that a downstream failure occurred during the recording.

Once each of the recorded segments have been tagged by the secondary record server (N+2) and copied, the secondary record server (N+2) may prompt the other record servers containing recorded segments to delete those segments. With respect to FIG. 9, for example, the secondary record server (N+2) tasked to record the third segment 176 of the call session may notify the record servers (N,N+1) tasked to record the first and second segments 160,166 to delete those segments 160,166. Each notified record server (N,N+1) may then change the status of the segments to "delete-internal-error," thus tagging those segments for later deletion.

Each of the record servers can be configured to search for any call segments within its file storage repository tagged in a "delete-internal-error" state, and then automatically delete the tagged segments as well as any information associated with those segments. The deletion of tagged segments can be performed, for example, at particular time period(s) during the day, or in response to a request from the communications manager 20 and/or a third-party application or database 34. If, for example, a call session segment is tagged in a "delete-internal-error" state, the record server can be configured to automatically delete the segment in response to a business rule from a third-party application that requires incomplete recordings be automatically deleted.

In some embodiments, each record server, or alternatively another server or application linked to each record server, can be configured to perform an archiving or file transfer step that can be used to automatically copy or move any segments tagged as complete to an alternative file storage location. In certain embodiments, for example, one of the record servers can be configured to automatically move any recorded call sessions tagged as "complete-internal-error-respondent" to another file storage location (e.g., an external storage area network or network-attached storage device), and then permanently delete the recording at the original file storage location. In other embodiments, an archival copy of any recorded segments tagged as "complete-internal-error-respondent" can be made, providing a backup copy of the recording at an alternative file storage location. In still other embodiments, particular business rules can be invoked to determine whether a recorded call session is either permanently moved to another file storage location, or whether a backup copy is made at another file storage location.

During the archiving or file transfer step, the recording state associated with the recorded call session may be changed depending on whether the recorded call session is being permanently moved or copied. If, for example, the recorded call session is to be copied, the recording state may be changed from a "complete-internal-error-respondent" state to a "complete-IER-copy-pending" state, indicating that the call session recording is complete, contains an error, and is in the process of being copied to another file storage location. If the call session is complete and a copy exists at another file storage location, the recording state associated with the recorded call session may be changed from "complete-IER-copy-pending" to "complete-IER-copy," thus indicating that a copy of the recorded call session exists at another file storage location.

In similar fashion, if the recorded call session is to be permanently moved to another file storage location, the recording state may be changed from "complete-internal-error-respondent" to "complete-IER-move-pending," indicating that the call session is complete, contains an error, and is in the process of being moved to another file storage location. Once moved, the recording state associated with the record call session may be changed from "complete-IER-move-pending" to "complete-IER-move," thus indicating that the recorded call session has been moved to another file storage location. The recorded call session remaining at the original file storage location may be tagged "complete-IER-delete," indicating that the recorded call session is complete and can be deleted.

The use of tags to indicate that a failure occurred during the recording and that a part of the voice stream data between the agent and the external caller may not have been fully recorded may permit a third-party application or database to differentiate those recorded call sessions that did not include a failure. In some embodiments, a third-party application or database may implement a different business rule with respect to a recorded call session that is tagged as possibly being incomplete. In the recording of conversations between broker-dealers and customers in the financial services industry, for example, the enterprise software application for the broker-dealer may implement a business rule to delete only those recorded call sessions that are tagged as being possibly incomplete. Another example business rule may be to prompt the agent, a supervisor, or a compliance manager to follow up with the customer in the event a recorded call session is tagged as being possibly incomplete.

Embodiments of the present invention may be provided as a computer program product, which may include a machine-readable medium having stored thereon instructions that may be used to program a computer (or other electronic devices) to perform a process. The machine-readable medium may include, but is not limited to, floppy diskettes, optical disks, compact disc read-only memories (CD-ROMs), and magneto-optical disks, ROMs, random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A recording device for recording segments of call sessions over a VoIP network, the recording device comprising:
    a recording service configured to receive an agent voice data stream and an external caller voice data stream from an agent telephone station during a call session, the recording service configured to tag each recorded segment of the call session with an identifier indicating the recording state of the call session during the segment, the recorded segments comprising portions of the call session segmented by interruptions in the call session, the recording service further configured to perform a segmentation synchronization routine for gathering one or more tagged segments associated with the call session from another record server tasked to record the call session; and
    a file storage repository configured to store voice data and call data associated with each recorded segment of the call session.

2. The recording device of claim 1, wherein the identifier includes a parameter or field indicating whether an upstream failure occurred during the recording of the call session.

3. The recording device of claim 1, wherein the identifier includes a parameter or field indicating whether a downstream failure occurred during the recording of the call session.

4. The recording device of claim 1, wherein the identifier includes a parameter or field indicating a segment number of the each recorded segment.

5. The recording device of claim 1, wherein the identifier includes a parameter or field indicating a total number of segments associated with the call session.

6. The recording device of claim 1, wherein the identifier includes a parameter or field indicating whether the recording of the call session is complete.

7. The recording device of claim 1, wherein the call data associated with each recorded segment includes service data point information associated with the agent telephone station.

8. A system for recording call sessions over a VoIP network, the system comprising:
    at least one agent telephone station for monitoring call sessions between an agent and one or more external callers on a telephone network;
    a plurality of record servers configured to record agent voice data and external caller voice data from the agent telephone station during each call session, each record server including a recording service configured to tag each recorded segment of the agent voice data and external caller voice data with an identifier indicating the recording state of the call session during the segment, the recorded segments comprising portions of the call session segmented by interruptions in the call session, each record server further including a file storage repository configured to store voice data and call data associated with each recorded segment of the call session;
    at least one proxy server configured to selectively route the agent voice data and the external caller voice data for each call session to one or more of the record servers; and
    wherein at least one of the record servers is configured to run a segmentation synchronization routine configured to gather the tagged segments associated with the recorded call session from the plurality of record servers.

9. The system of claim 8, wherein each agent telephone station includes a VoiP telephone with a built-in-bridge or an associated gateway configured to transmit agent voice stream packets and external caller voice stream packets from the agent telephone station to record servers.

10. The system of claim 8, wherein the identifier includes a parameter or field indicating whether a failure occurred during the recording of the call session.

11. The system of claim 8, wherein the identifier includes a parameter or field indicating a segment number of each recorded segment.

12. The system of claim 8, wherein the identifier includes a parameter or field indicating a total number of segments associated with the call session.

13. The system of claim 8, wherein the identifier includes a parameter or field indicating whether the recording of the call session is complete.

14. The system of claim 8, wherein the call data associated with each segment includes service data point information associated with the agent telephone station.

15. The system of claim 8, wherein the proxy server comprises a stand-alone server in communication with each of the record servers.

16. The system of claim 8, wherein the proxy server is configured to load balance the recording of each segment across the record servers.

17. The system of claim 8, wherein the proxy server is configured to route a single call session to multiple record servers for recording.

18. The system of claim 8, further including a communications manager configured to route call sessions to the at least one agent telephone station.

19. The system of claim 18, wherein the communications manager is configured to load balance the recording of each segment of the call session across the record servers.

20. The system of claim 18, wherein the at least one proxy server comprises a plurality of proxy servers each configured to route the agent voice data and the external caller voice data for each call session to one or more of the record servers.

21. The system of claim 8, wherein the at least one agent telephone station includes videoconferencing or screen-capturing means, and wherein each record server is further configured to record video or screen data during a call session.

22. The system of claim 8, wherein the segmentation synchronization routine is configured to copy tagged segments stored on multiple record servers to a single record server or file storage repository.

23. A method of recording call sessions over a VoIP network including a plurality of recording devices configured to record call sessions from a number of agent telephone stations, the method comprising:
    initiating the recording of a call session between an agent telephone station and an external caller and receiving an agent voice data stream and an external caller voice data stream from the agent telephone station;
    prompting a plurality of the recording devices to record segments of the call session, the recorded segments comprising portions of the call session segmented by interruptions in the call session;
    tagging each recorded segment of the call session with an identifier indicating the recording state of the call session during the recorded segment;
    storing each recorded segment of the call session within a file storage repository; and gathering each of the tagged segments associated with the call session recorded on each of the recording devices; and storing the segments as a single call session.

24. The method of claim 23, wherein tagging each recorded segment of the call session with an identifier indicating the recording state of the call session includes associating a parameter or field with each recorded segment indicating whether a failure occurred during the recording of the call session.

25. The method of claim 23, wherein tagging each recorded segment of the call session with an identifier indicating the recording state of the call session includes associating a parameter or field with each recorded segment indicating the segment number.

26. The method of claim 23, wherein tagging each recorded segment of the call session with an identifier indicating the recording state of the call session includes associating a parameter or field indicating the total number of recorded segments in the call session.

27. The method of claim 23, wherein tagging each recorded segment of the call session with an identifier indicating the recording state of the call session includes associating a parameter or field indicating whether the recording of the call session is complete.

28. The method of claim 23, wherein gathering each of the tagged segments recorded on each of the recording devices is performed by a first recording device, and includes:

searching a file storage repository of the first recording device for a tagged segment of the call session;

identifying one or more other recording devices containing, in a respective file storage repository, at least one other tagged segment of the call session; and copying or moving each segment recorded by one or more other recording devices to the file storage repository of the first recording device.

29. The method of claim 28, further comprising prompting the one or more other recording devices to delete the recorded segments upon copying each segment to the file storage repository of the first recording device.

\* \* \* \* \*